United States Patent
Gruber et al.

(10) Patent No.: US 6,439,469 B1
(45) Date of Patent: Aug. 27, 2002

(54) PREDICTIVE APPARATUS FOR REGULATING OR CONTROLLING SUPPLY VALUES

(75) Inventors: Peter Gruber, Zwillikon; Jürg Tödtli, Zürich, both of (CH)

(73) Assignee: Siemens Building Technologies AG (CH)

( * ) Notice: Subject to any disclaimer, the term of this patent is extended or adjusted under 35 U.S.C. 154(b) by 0 days.

(21) Appl. No.: 09/617,200

(22) Filed: Jul. 17, 2000

(30) Foreign Application Priority Data

Aug. 2, 1999 (EP) .............................. 99115219

(51) Int. Cl.$^7$ .................... G01M 17/00; G06F 19/00
(52) U.S. Cl. ................... 237/8 R; 236/78 D; 700/31; 700/36
(58) Field of Search ................... 237/8 R; 236/78 D; 700/31, 36, 276, 278

(56) References Cited

U.S. PATENT DOCUMENTS

| | | | |
|---|---|---|---|
| 5,115,967 A | | 5/1992 | Wedekind .................. 236/46 R |
| 6,064,916 A | * | 5/2000 | Yoon ....................... 700/31 X |
| 6,138,048 A | * | 10/2000 | Hayner ....................... 700/31 |
| 6,264,111 B1 | * | 7/2001 | Nicolson et al. .............. 236/51 |

FOREIGN PATENT DOCUMENTS

| | | | |
|---|---|---|---|
| EP | 0 462 815 A2 | 12/1991 | ........... G05B/13/04 |
| EP | 0 584 852 A1 | 3/1994 | .......... G05D/23/19 |
| EP | 0 915 301 A2 | 5/1999 | ............ F24F/11/00 |
| WO | WO 94/27202 | 11/1994 | |

OTHER PUBLICATIONS

"Control Reconfiguration with Acutator Rate Saturation," M. Pachter et al., *Proceedings of the 1995 American Control Conference*, Bd. 5, 21, Jun. 1995, pp. 3495–3499.

"Neurobat, Predictive Neuro–fuzzy Building Control System," Mario El–Khoury et al., *Swiss Federal Office of Energy*, May 1998.

\* cited by examiner

Primary Examiner—William Wayner
(74) Attorney, Agent, or Firm—Proskauer Rose LLP

(57) ABSTRACT

A predictive apparatus for controlling or regulating supply values (T_VRL) includes a first data store in which rules, based on a linear consumer model, for calculating process values are stored, a second data store in which rules for restrictions or limit values to be observed for process values and for values derived from process values are stored, and further also means for repeatable optimizing of the energy consumption or of the energy costs with the aid of linear or quadratic programming. The apparatus is configured such that the optimizing can be carried out over a sliding time horizon.

20 Claims, 8 Drawing Sheets

PREDICTIVE APPARATUS FOR REGULATING OR CONTROLLING SUPPLY VALUES

BACKGROUND OF THE INVENTION

1. Field of the Invention

The invention relates to a predictive apparatus for regulating or controlling supply values, such as indoor climate control values or process values of an energy generator or energy distribution system.

Such apparatuses are suitable, for example, for heating/cooling buildings, wherein by means of the apparatus heat energy or cooling energy can be saved. Further, such apparatuses are also suitable for operating an energy storage system such as, for example, a cold store.

2. Description of the Prior Art

An apparatus of this kind is known from EP 462 815, in which a tuner is used to establish a variable time horizon and a sampling rate.

In WO 94/27202, it is suggested that to minimise costs, electrical heating is switched according to tariff and weather forecast data received.

It is also known to model in a predictive controller a building or respectively a room with a neuronal network (Mario El-Khoury et al: NEUROBAT, Predictive Neuro-fuzzy Building Control System. May 1998).

With known predictive control apparatuses, there is the disadvantage that in general, with reasonable computing complexity, only relatively short time horizons, for example of 6 hours, can be calculated, which is here considered as insufficient.

SUMMARY OF THE INVENTION

The object of the invention is to propose a predictive apparatus with which necessary values can be reliably calculated over a substantially longer time horizon—that is to say one or more days- using inexpensive means.

If the supply values are indoor climate control values, a room or building model is used. By using a room or building model, basically a simpler structure is produced for the regulating and control apparatus, as by means of said model both the regulating method based on a heat curve and the optimum start and stop time control method, known as OSSC, and in addition the switch for heat limits, can be used.

Further, energy saving by minimising a cost function can be obtained wherein the cost function advantageously includes comfort and energy terms.

The invention provides predictive apparatus for controlling or regulating supply values, wherein the apparatus is provided with:

a first data store, in which rules, based on a linear consumer model, for calculating process values are stored, a second data store, in which the rules for restrictions or limit values to be observed for process values and values derived from process values are stored, and means for repeatable optimising of the energy consumption or of the energy costs with the aid of linear or quadratic programming, wherein the means is configured such that the optimising can be carried out over a sliding time horizon.

Advantageous configurations are set forth in the dependent claims.

BRIEF DESCRIPTION OF THE DRAWINGS

Hereinafter, preferred embodiments of the invention will be described in more detail with reference to the drawings. The examples described relate to the control or respectively the regulation of indoor climate control values. It is obvious that the examples are, however, transferable with little difficulty to apparatuses for controlling or regulating other supply values. In general, that is to say when controlling or regulating supply values, with an apparatus according to the invention, a consumer model is used instead of a room or building model.

There is shown, in:

In FIG. 1, an arrangement with a generally predictive apparatus for regulating and controlling indoor climate control values is divided into three function modules joined one to another, wherein a predictive controller is designated 1, a flow temperature control 2, and a room/building 3.

Figure 1:
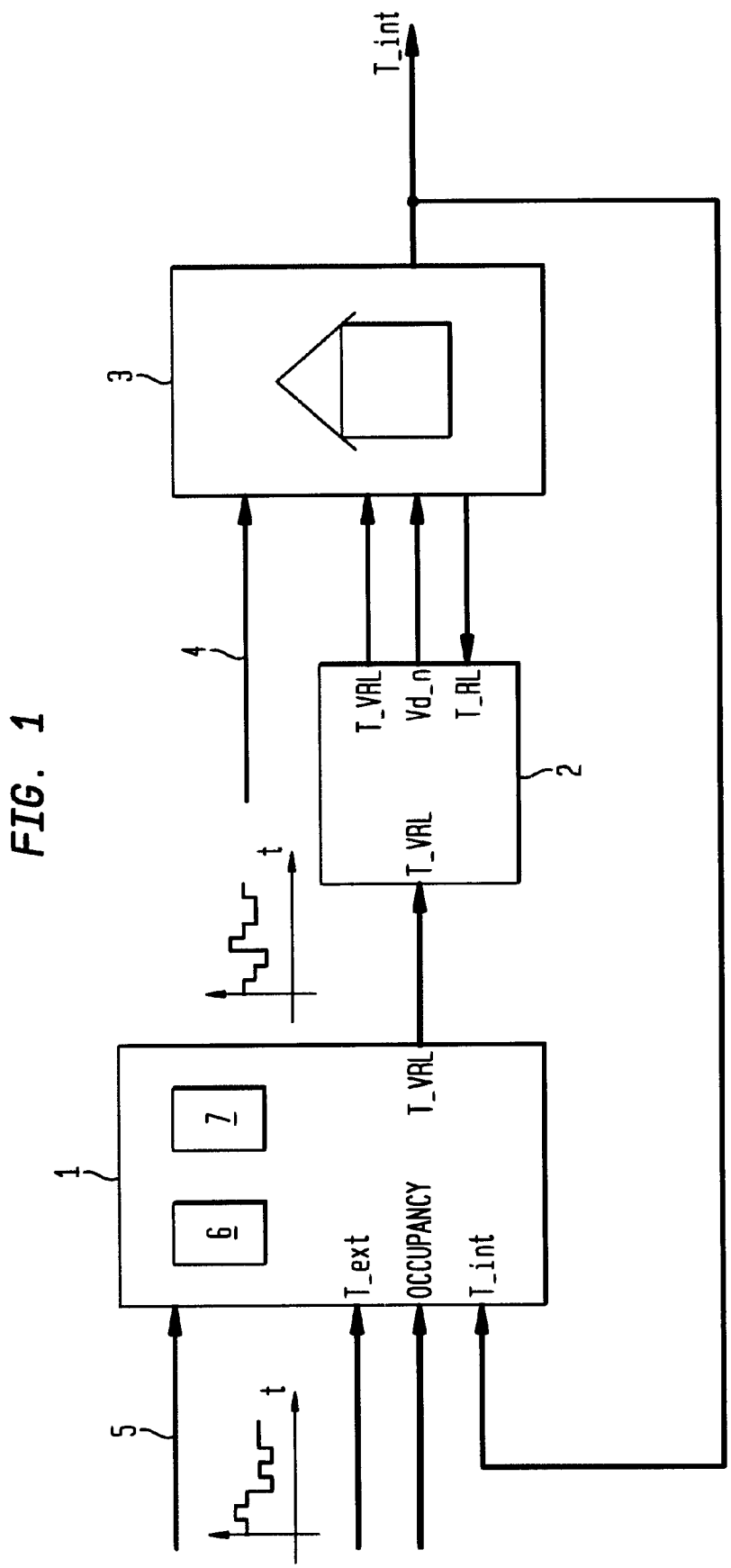
FIG. 1 the principal structure of a generally predictive apparatus for regulating and controlling indoor climate control values, FIG. 2 essential function modules of the predictive apparatus, FIG. 3 a selection of types of buildings in which the predictive apparatus is useable, FIG. 4 a structure of the time horizon of the predictive apparatus, FIG. 5 exemplary diagrams of the optimising functions of the predictive apparatus, FIG. 6 a room model which can be used in the predictive apparatus, FIG. 7 a detail of the structure of the time horizon of the predictive apparatus, FIG. 8 transmission equations of the predictive apparatus, and FIG. 9 the principal structure of a function module of the predictive apparatus designated as a monitor.

Disturbance inputs 4 affecting the indoor climate control are, for example, the outside temperature, the incoming solar radiation, the wind, and extraneous heat. Controlling inputs affecting the indoor climate control values are, in this case, the flow temperature T_VRL, with a normalized volume through-flow Vd_n belonging to it, of which, in the case illustrated, only the measured outside temperature T_ext and the flow temperature T-VRL regulated by the controller 1 itself are available to the controller 1.

Inputs to the flow temperature control 2 are the flow temperature reference value T_VRL calculated by the predictive controller 1, and the temperature return flow T_RL.

The task of the predictive controller 1 is now to control the control values—here, the flow temperature over a pre-determined time horizon, such that the inside temperature T_int in the room/building 3 satisfies the specifications of the user. For this, the controller 1 naturally requires a room/building model, here, for example, a $2^{nd}$ order linear model, and the arrangement and the forecast profile of weather values—here, for example, only the outside temperature T_ext and the occupancy of the room or of the building. From the output sequence of temperatures flows, in each step only the first value T_VRL is used and relayed to the flow temperature control 2, which additionally takes over the function of switching a pump on and off.

In a variation of the predictive apparatus, the regulated or controlled supply value—in this case the inside temperature T_int—is measured and supplied to the predictive controller 1.

The user can influence the behaviour of the predictive controller 1 by means of user adjustments 5.

Figure 2:
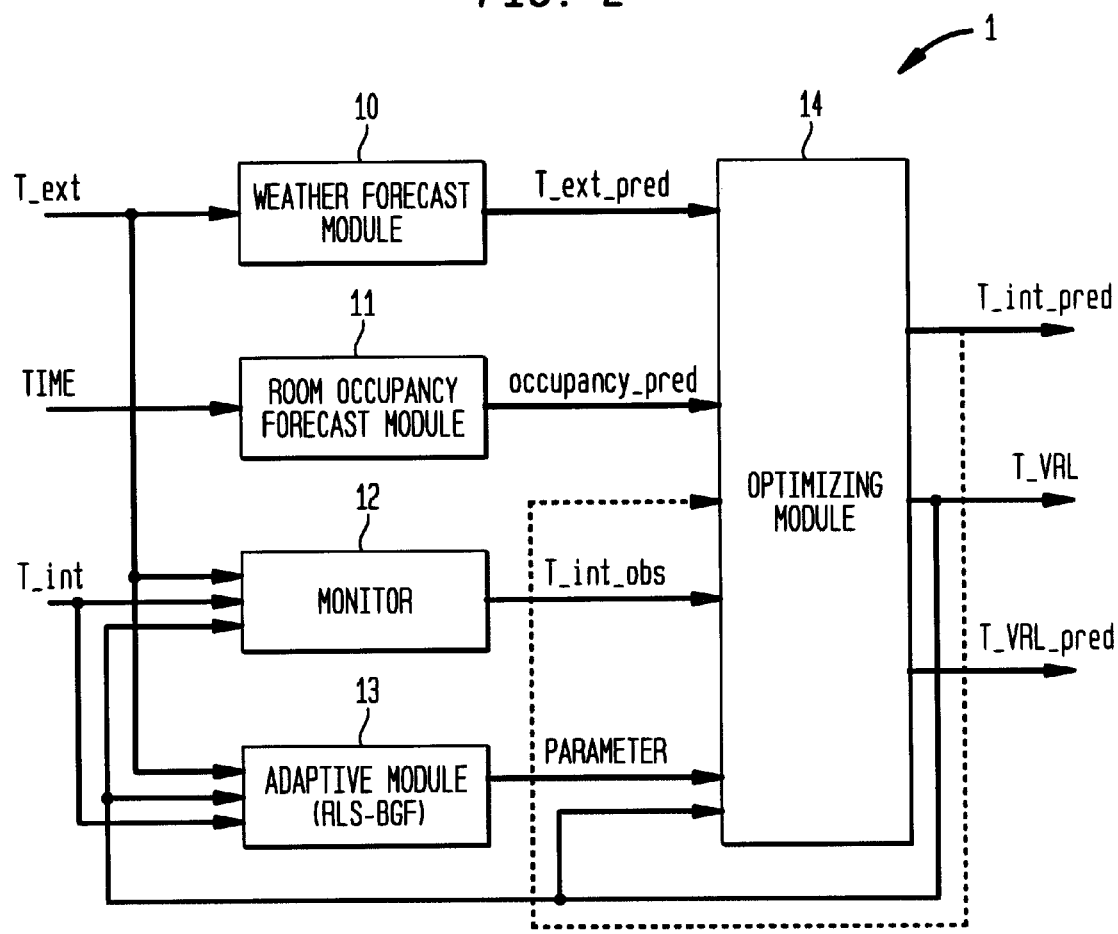

The predictive controller 1 can be separated into different, easily separated function units, which are, for example, shown in FIG. 2, in which a weather forecast module is designated 10, a room occupancy forecast module 11, a monitor 12, an adaptive module 13, and an optimising module 14.

Only the outside temperature is forecast in this case as the weather forecast, however, the procedure is analogous for several values to be forecast. The output of the weather forecast module 10 is a profile T_ext_pred of the outside temperature for the length of the time horizon. With the weather forecast, it is important that it can be examined with respect to its functioning capability independently of the other components of the controller 1 and consequently can be treated separately.

The room occupancy is calculated in advance using the current time, the start and stop times for which can be input by the user for each day of the week.

In the case of room temperature measurement, two functions are involved: the monitor 12 and the parameter adaptation in the adaptive module 13. Without room temperature measurement, these cease to apply, and the forecast inside temperature T_int_pred is used as the inside temperature for the next cycle of calculation, which is shown in FIG. 2 by a strip shown in broken lines on the optimising module 14.

The monitor 12 is used in this case for filtering the inside temperature—and not for estimating an unknown value—in order to diminish rapid changes in the signal. In spite of the use of the monitor 12 as a filter, the phase of the estimated inside temperature by virtue of the 2nd order room model used in the monitor compared to classic filters is not too greatly displaced. The parameters of the room model can be estimated using the adaptive module 13, and—after the parameter estimates have stabilised—also used for optimising.

Figure 4:
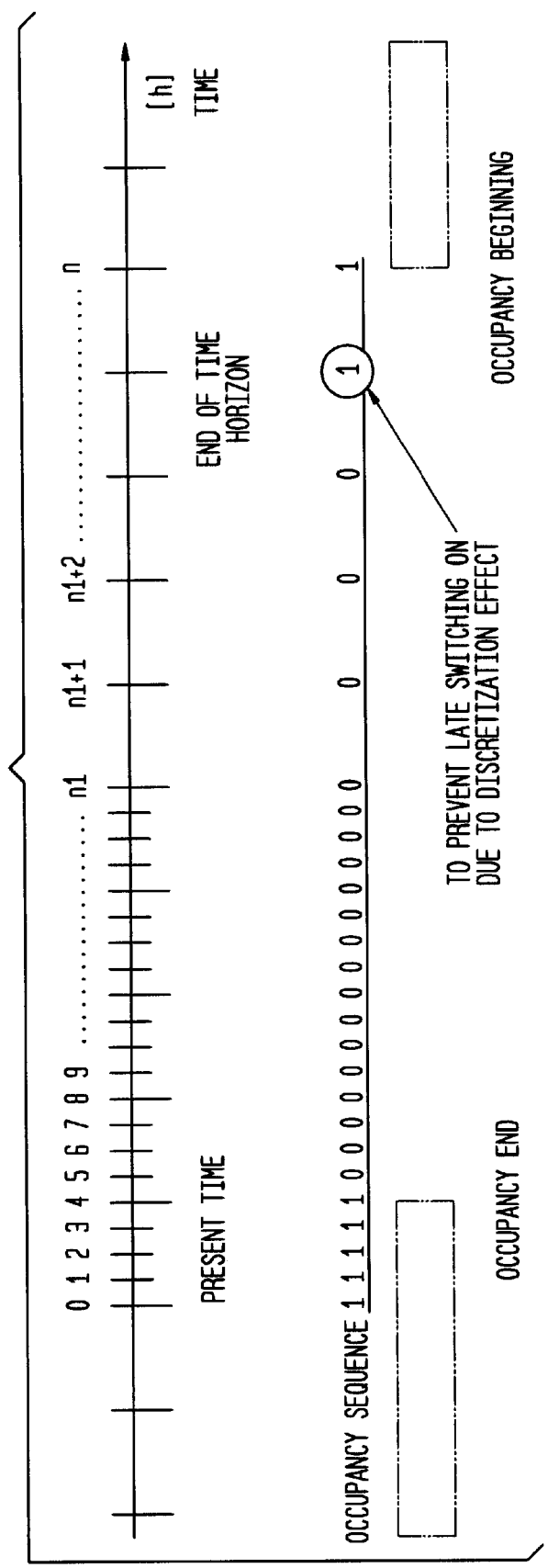

All the disturbance values which affect the room 3 (FIG. 1), in the present case the room occupancy and the outside temperature, must be calculated in advance for every point in time of optimising over the time horizon as profiles. For this, the horizon is divided into n sampling steps. As is shown in FIG. 4, the horizon can be divided into n1 short and n−n1−1 long sampling steps. The sampling time of the controller, and thereby also the time after which the optimising is repeated, is T_sim. The sampling time of the short steps at the beginning of the time horizon are in this case, for example, selected as being equal to T-sim, and the sampling time Ts of the long steps as Ts=4*T_sim.

The weather forecast module 10 delivers for the n points in time the values calculated in advance as a result of a model. The room occupancy forecast module 11 correspondingly delivers the room occupancy calculated in advance in the form of a 0 (not occupied) −1 (occupied) sequence (FIG. 4). For this, the module requires the current time, the profile of the week, and the sampling times T_sim and Ts.

The numbers above the time axis in FIG. 4 are those values which assume the flow variable i during an optimising cycle. For every time point required, it is detected whether the room is occupied or not occupied. A possible occupancy profile is given in the lowest part of FIG. 4.

As the time steps according to n1 are four times larger than the previous ones, at the time points greater than equal to n1, it is advantageously tested as to whether the next time point lies within an occupancy period. When this is the case, the occupancy variable of this time point is also set to 1. This is done to ensure timely heating up in the morning or after a weekend. On the nth time, the n+1-th time is accessed.

Figure 5:
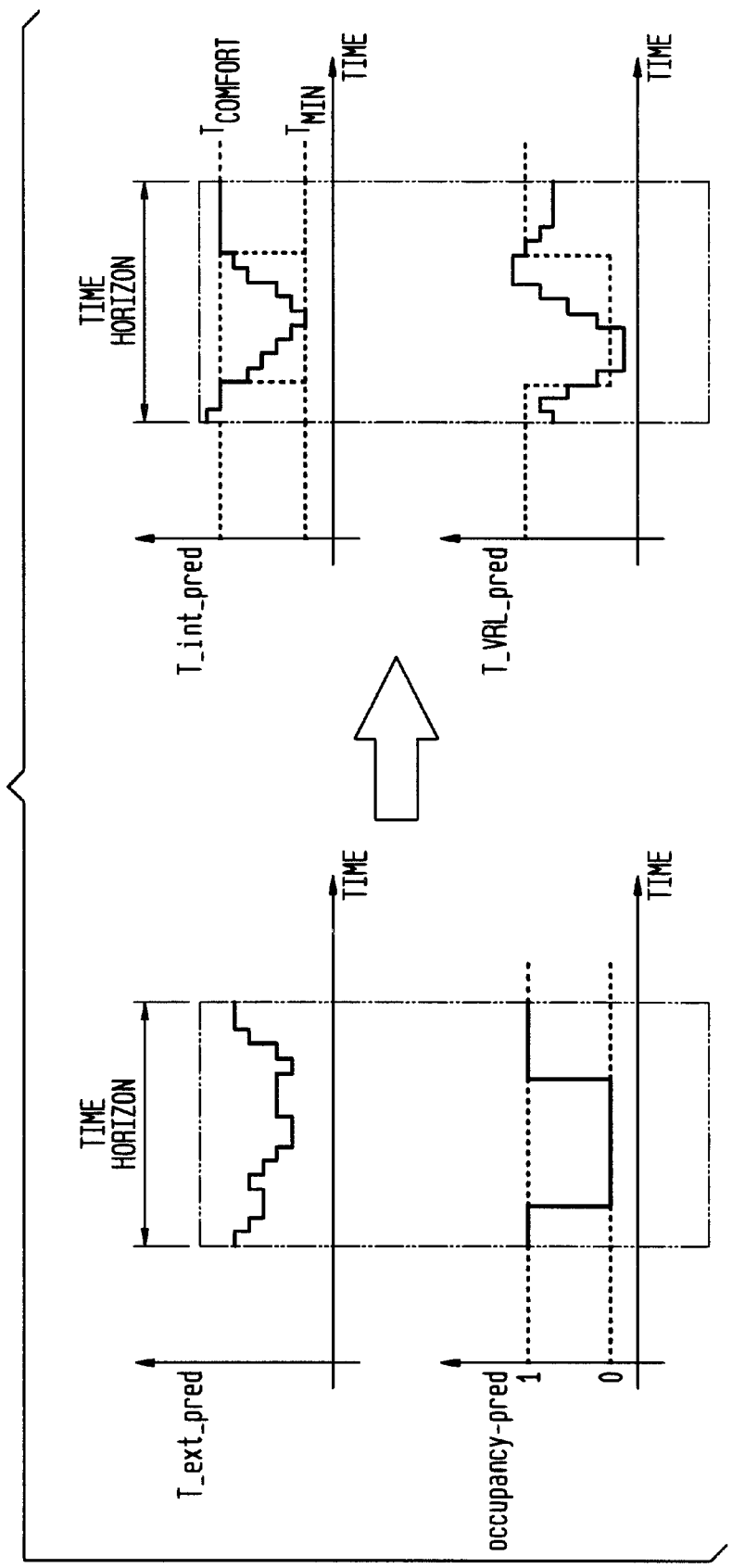

In FIG. 5, a first diagram shows the T_ext_pred profile of the forecast outside temperature, a second diagram shows the occupancy-pred profile of the room occupancy calculated in advance, a third diagram shows the T_int_pred profile of the forecast inside temperature, and a fourth diagram the T_VRL_pred profile of the forecast flow temperature, in each case over the time horizon.

The task of the optimising module 14 is to forecast from the forecast outside temperature T_ext_pred, the room occupancy calculated in advance occupancy_pred, the filtered inside temperature T_int_obs, the current inside temperature T_int measured or calculated from the model, and from the room model of the controller including the parameters belonging to it, the inside temperature development T_int_pred and flow temperature development over the time horizon. The flow temperature profile to be calculated, advantageously composed of T_VRL and T_VRL-pred, has to be determined such that a cost function is optimised, and at the same time additional physically-based conditions are taken into account, so that a compromise between energy and cost optimisation is obtained. The conditions relate to the flow and inside temperatures calculated in advance. The first value of the output profile T_VRL is then set.

Optimising is solved with the aid of linear or respectively quadratic programming.

Linear programming minimises the linear expression $\underline{f}^T\underline{x}$ on condition that $A\underline{x}<=\underline{b}$, wherein the conditions include both equality conditions and inequality conditions for the flow temperatures, flow temperature changes and room temperatures.

Quadratic optimising minimises the quadratic expression $\frac{1}{2}\underline{x}^T H\underline{x}+\underline{f}^T\underline{x}$. The equality conditions remain the same as for linear programming, namely, the n-times use of the differential equation with which the inside temperature is calculated in advance. The inequality conditions can also be partly taken over.

In this way optimising for a cycle can be started. The calculated room and flow temperatures are composed as follows: forecast inside temperatures for the n future time points, optimum current flow temperature to be set, optimum flow temperature to be set for the n−1 future time points. Optimisation applies naturally only if the room model used in the controller 1 agrees with the actual distance, and where the forecast disturbance values occur.

In addition to a hoped for saving in heat energy, a goal of the predictive controller 1 is also the uniting of three functions of heating of buildings which were until now treated separately: The controller should replace the outside temperature-guided flow temperature control (heat curve), the optimum start and stop time control (OSSC), and the heat limit switch as a single function.

Figure 3A:
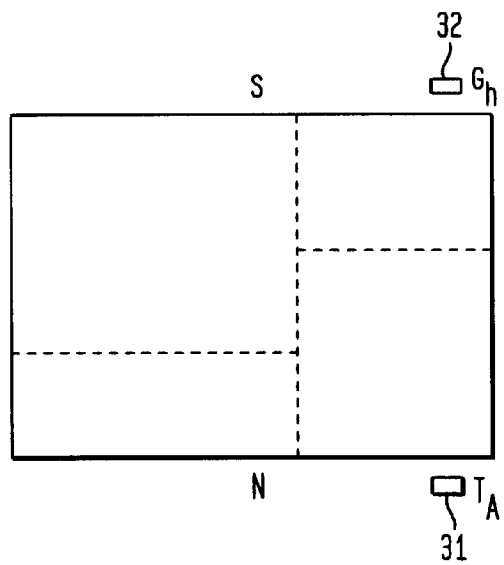
Figure 3B:
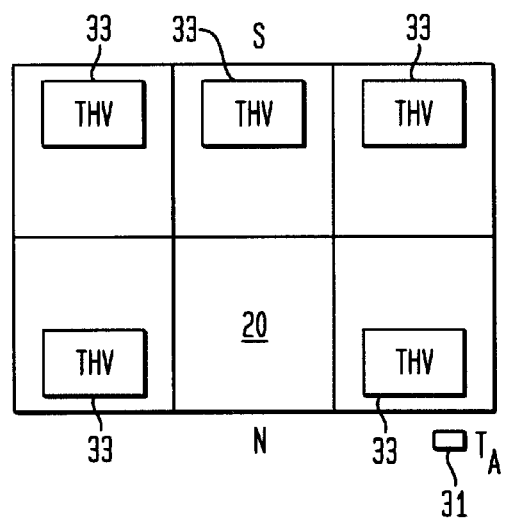
Figure 3C:
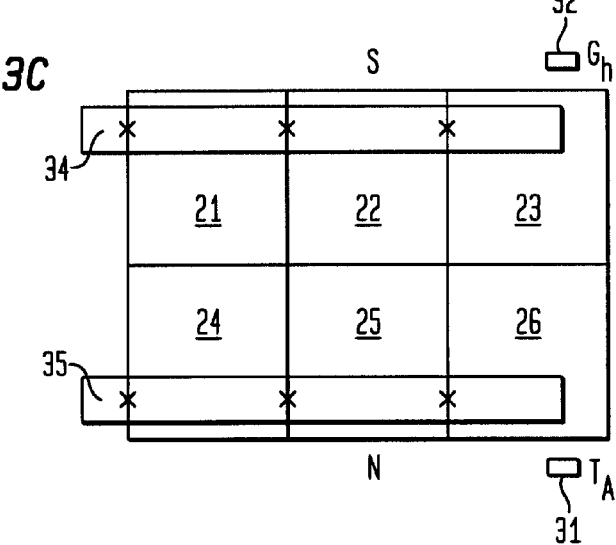

As control distances and respectively the types of buildings vary greatly, the following three basic instances, each with and without inside temperature sensors—will be examined individually (FIG. 3).

The first basic case (FIG. 3a) relates to a detached house regarded as a room, as an example with underfloor heating, with and without taking into account the incoming solar radiation. The detached house has a south-facing wall S and a north-facing wall N which have an external temperature sensor for measuring the outside temperature $T_A$ and a sensor for the incoming solar radiation $G_h$.

The second basic case (FIG. 3b) relates to several rooms with a reference room 20 without incoming sun. Apart from the reference room 20, the rooms are controlled by thermostatic valves THV. An external temperature sensor for the outside temperature $T_A$ is arranged on the north elevation N.

The third basic case (FIG. 3c) lastly relates to a building which has two heating circuits, wherein a first heating circuit supplies rooms 21, 22 and 23 of the south elevation S, and a second heating circuit supplies rooms 24, 25 and 26 of the north elevation N. The north elevation has an external temperature sensor for the outside temperature $T_A$.

Room Model

Figure 6:
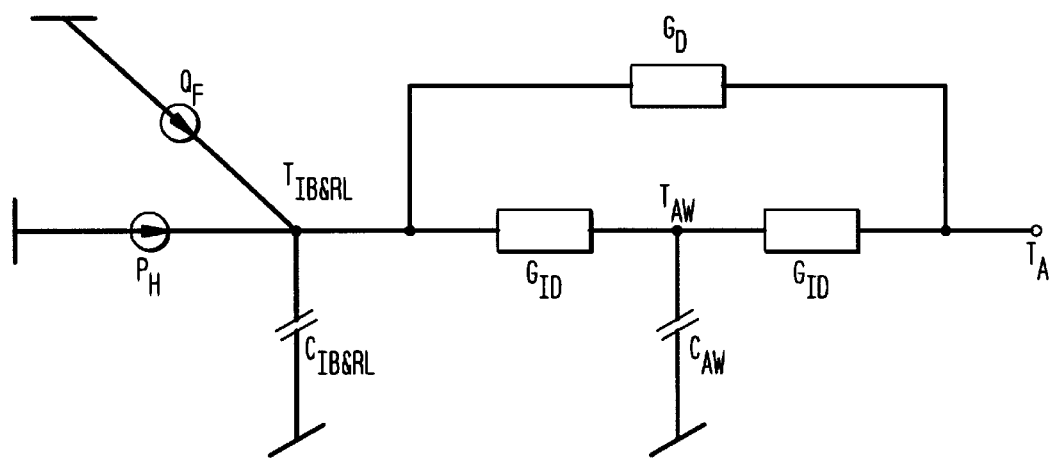

The predictive controller 1 with the monitor 12 and the adaptive module 13 advantageously use a $2^{nd}$ order room model for optimising. The physical representation of the room model is shown in FIG. 6, wherein $T_{IB\&RL}$ indicates the temperature of the inside components and the atmospheric air, and $T_{AW}$ the temperature of the external wall and $T_A$ the outside temperature.

Two heat stores with associated heat capacities $C_{IB\&RL}$ and $C_{AW}$ are the components including the atmospheric air, and the external wall. The heating capacity $P_H$ and the extraneous heat $Q_F$ directly affect the first store. By means of the two expanded heat conduction values $G_{ID}$ of the external wall, an indirect heat transfer can take place via the intermediate store with capacity $C_{AW}$, and by means of the expanded heat conduction value $G_D$ of the window, a direct heat transfer can take place between the inside and the outside. By means of the two energy balances for the two heat stores ($1^{st}$ law of thermodynamics) the differential equation system can be determined. With a model for stationary operation, the heating power $P_H$ can be expressed with the flow temperature and the room temperature.

$$P_H = (T\_VRL - T_{IB\&RL})kFf(v)$$

$$f(v) = v\left(1 - e^{\frac{1}{v}}\right), \quad v = \frac{mc}{kF}$$

In this case, F is the heater surface, k is the heat through-flow coefficient, m is the mass flow and e is the specific heat capacity of the energy carrier, and it is valid to assume that the heating power output in the room follows in a linear manner the temperature differential of the flow temperature T_VRL minus the temperature of the internal components and the atmospheric air $T_{IB\&RL}$. In this way a continuous structural room model is produced $$d\underline{x}/dt = A\underline{x} + B\underline{u}$$

$$y = C\underline{x}$$

with the two store temperatures $T_{IB\&RL}$ and $T_{AW}$ as structures, $T_{IB\&RL}$ as output and the three inputs, flow temperature $T_{VRL}$, outside temperature $T_{AW}$ and extraneous heat $Q_F$. The store temperature $T_{IB\&RL}$ can correspond with the inside temperature T_int.

$$\begin{bmatrix} \dot{T}_{IB\&RL} \\ \dot{T}_{AW} \end{bmatrix} = \underbrace{\begin{bmatrix} -\frac{G_D + G_{ID} + kFf(v)}{C_{IB\&RL}} & \frac{G_{ID}}{C_{IB\&RL}} \\ \frac{G_{ID}}{C_{AW}} & -\frac{2G_{ID}}{C_{AW}} \end{bmatrix}}_{A} \begin{bmatrix} T_{IB\&RL} \\ T_{AW} \end{bmatrix} +$$

$$\underbrace{\begin{bmatrix} \frac{kFf(v)}{C_{IB\&RL}} & \frac{G_D}{C_{IB\&RL}} & \frac{1}{C_{IB\&RL}} \\ 0 & \frac{G_{ID}}{C_{AW}} & 0 \end{bmatrix}}_{B} \begin{bmatrix} T_{VRL} \\ T_A \\ Q_F \end{bmatrix}$$

This continuous structural room model is then analytically discretized by using inverse Laplace transformation, wherein the following discrete representation results:

$$\underline{x}_{k+1} = F\underline{x}_k + G\underline{u}_k$$

$$y_k = C\underline{x}_k$$

$$F = \begin{pmatrix} f_{11} & f_{12} \\ f_{21} & f_{22} \end{pmatrix} \quad G = \begin{pmatrix} g_{11} & g_{12} & g_{13} \\ g_{21} & g_{22} & g_{23} \end{pmatrix}$$

With the variables u=u(1), w=u(2), and q=u(3), and the distribution of G in G=[$G_1 G_2 G_3$] there results:

$$\underline{x}_{k+1} = F\underline{x}_k + \underline{G}_1 u_k + \underline{G}_2 w_k + \underline{G}_3 q_k$$

$$y_k = C\underline{x}_k$$

With a unit matrix I, the calculation of the z-transmission functions takes place with the formula:

$$[G_{T\_VRL}(z) G_{TA}(Z) G_{QF}(z)] = C(zI - F)^{-1} [\underline{G}_1 \underline{G}_2 \underline{G}_3]$$

From this, a differential equation can be derived for the inside temperature $y = T\_int = T_{IB\&RL}$ $$y_{k+2} = (f_{11} + f_{22})y_{k+1} + (f_{12}f_{21} - f_{22}f_{11})y_k +$$

$$g_{11}u_{k+1} + (f_{12}g_{21} - f_{22}g_{11})u_k + g_{12}w_{k+1} + (f_{12}g_{22} - f_{22}g_{12})w_k + g_{13}q_{k+1} + (f_{12}g_{23} - f_{22}g_{13})q_k$$

Assuming a constant extraneous heat q and the abbreviations $p_1 = (f_{11} + f_{22})$ $p_2 = (f_{12}f_{21} - f_{22}f_{11})$ $p_3 = g_{11}$ $p_4 = (f_{12}g_{21} - f_{22}g_{11})$ $p_5 = g_{12}$ $p_6 = (f_{12}g_{22} - f_{22}g_{12})$ $p_7 = g_{13}q + (f_{12}g_{23} - f_{22}g_{13})q$ And the displacement of the differential equation by one time step, from the above differential equation for the inside temperature there is obtained:

$$y_{k+1} = p_1 y_k + p_2 y_{k-1} + p_3 u_k + p_4 u_{k-1} + p_5 w_k + p_6 w_{k-1} + p_7$$

Figure 8:
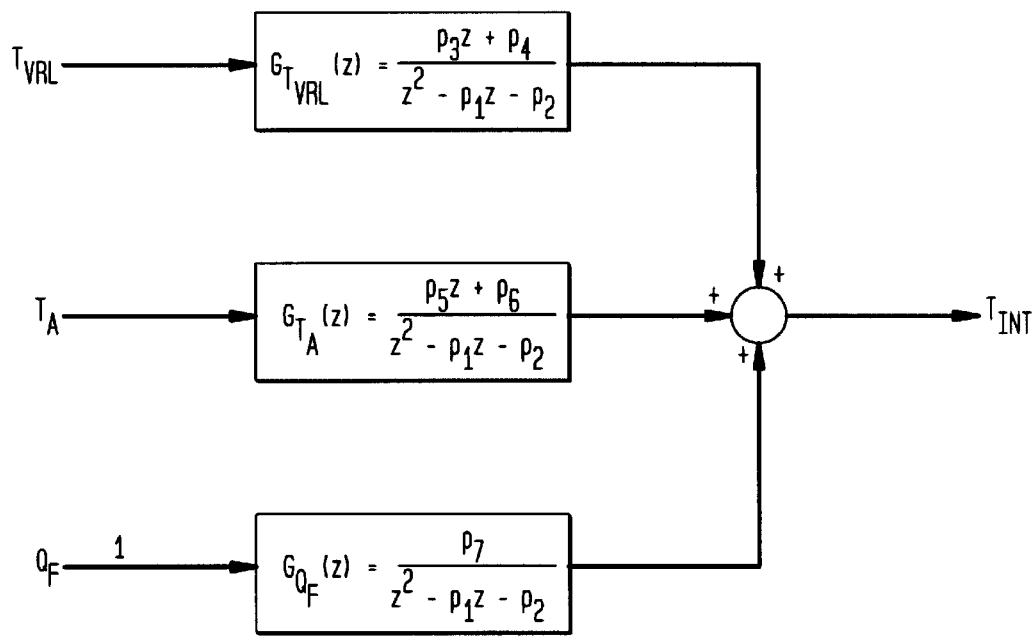

A block diagram with the individual transmission functions is shown in FIG. 8.

The parameters of the differential equation can be determined in three different ways. In the first case parameters are used which were identified by off-line parameter estimation. The second way allows the input of the physical values of the $2^{nd}$ order room model, which is used in the controller. From this the continuous structural room model is created, then made discrete, and lastly the three discrete transmission functions (first, second and third input to output) determined. In the third case, the time constants and amplification factors from the transmission behaviour can be input on the one hand from the outside temperature to the inside temperature and on the other hand from the flow temperature to the inside temperature (for example, determined by measuring step responses of the room model). All three possibilities produce the system parameters $p_i$ (i=1,2, . . . ,7) of the controller model for the sampling time T_sim.

Sampling Time Change

In order that the controller can continue computing in the second part of the time horizon (see above) with the step width Ts, in the last section of the function, the parameter with the sampling time Ts is determined from that with sampling time T_sim. The resulting parameters are stored as further $p_i$ (i=1,2, . . . ,7).

It has already been explained with reference to FIG. 4 how the time horizon is advantageously made discrete, namely with the sampling time T_sim for the first n1 steps and with Ts (=4*T_sim) for the last n−n1 steps. For the first steps, naturally the differential equation for the sampling time T_sim is used, and for the last steps the differential equation for the sampling time Ts. The way in which the parameters for the differential equation can be obtained for the new sampling time Ts with a $2^{nd}$ order system with actual poles will be indicated hereinafter. The n1+1-th step is a special case. The way in which this transition parameter is determined will also be described.

For sampling time conversion from T_sim to Ts, firstly the continuous $2^{nd}$ order transmission function corresponding to the differential equation is started from, as the differential equation can, according to FIG. 8, be considered in the form of three transmission equations with the same denominator.

This is split into nominal fractions according to the formula below, wherein a and b are real numbers (real poles).

$$G(s) = \frac{b_1 s + b_0}{s^2 + a_1 s + a_0} = k_1 \frac{a}{s+a} + k_2 \frac{b}{s+b}$$

The transmission function $$\frac{G(s)1 - e^{-sT}}{s}$$

(the second factor is the holding/sampling member, that is to say zero order hold) is now transformed by Z (see Ackermann [5] p. 376).

$$G_1(z) = k_1 \frac{(1-e^{-aT})z}{(z-1)(z-e^{-aT})}(1-z^{-1}) + k_2 \frac{(1-e^{-bT})z}{(z-1)(z-e^{-bT})}(1-z^{-1}) =$$

$$k_1 \frac{1-e^{-aT}}{z-e^{-aT}} + k_2 \frac{1-e^{-bT}}{z-e^{-bT}}$$

The discrete transmission function from the parameters pi (i=1, . . . ,4) of the differential equation can easily be formed. Afterwards, splitting into nominal fractions again takes place.

$$G_2(z) = \frac{p_3 z + p_4}{z^2 - p_1 z - p_2} = \frac{p_3 z + p_4}{(z-z_1)(z-z_2)} = \frac{A}{z-z_1} + \frac{B}{z-z_2}$$

$$z_{1/2} = \frac{p_1 \pm \sqrt{p_1^2 + 4p_2}}{2}$$

$$A = \frac{p_3 z_1 + p_4}{z_1 - z_2}$$

-continued $$B = \frac{p_3 z_2 + p_4}{z_2 - z_1}$$

For the same sampling times T, $G_1(z)=G_2(z)$ now applies. For the faster pulse with the sampling time T_sim, the parameters are known, consequently a, b, $k_1$ and $k_2$ (these are independent of the sampling time, as they are continuous parameters) are determined. The new parameters can now be determined from the same equation for the slower pulse with sampling time Ts. As overall 3 transmission functions exist for the three inputs, this process must be carried out three times.

Figure 7:
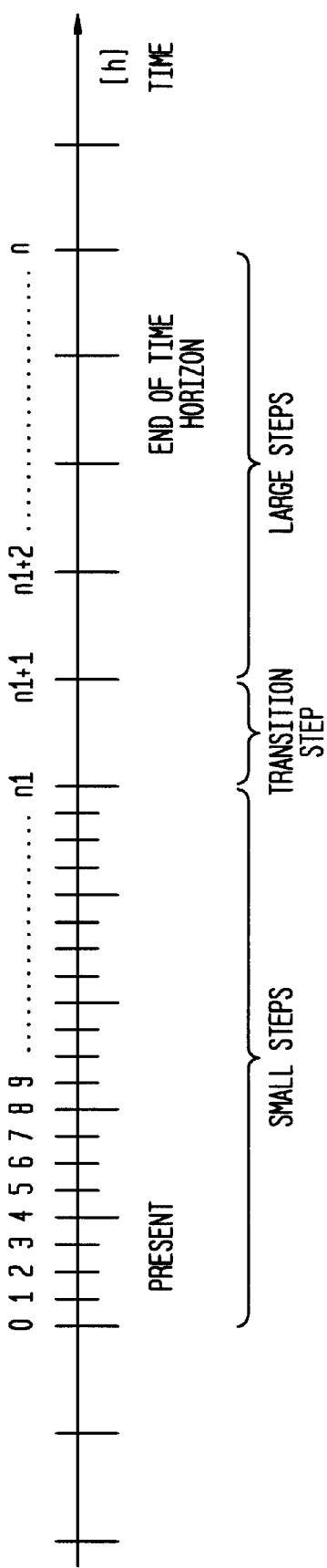
Figure 9:
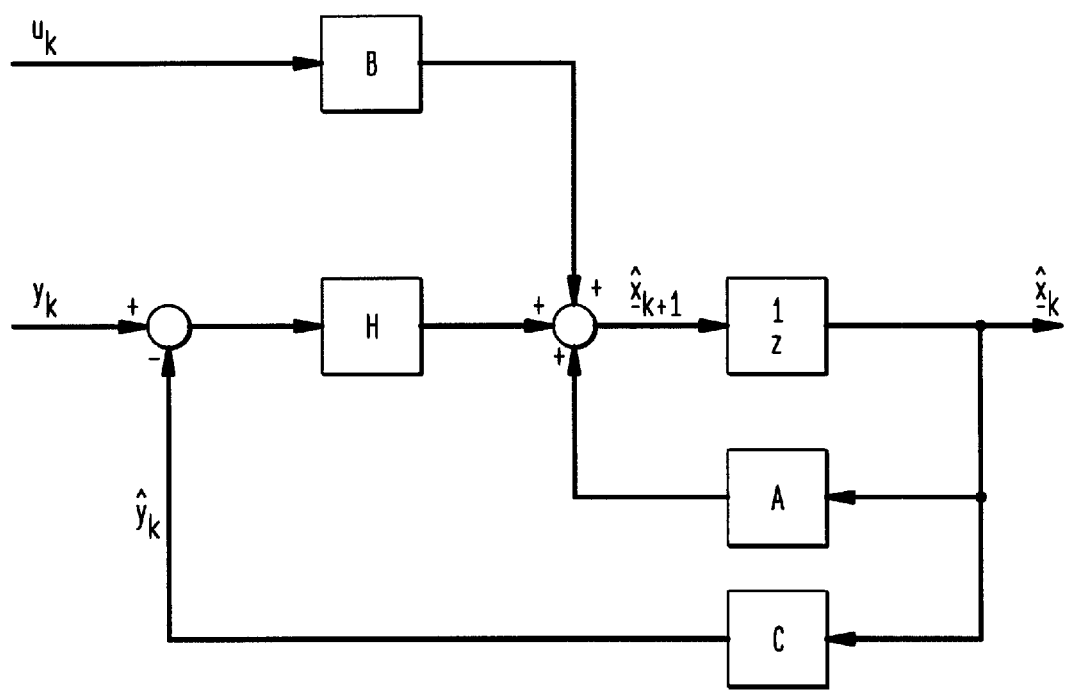

The parameters of the transition step shown in FIG. 7 from smaller to four-times larger sampling times can be obtained by step-wise changing of the "old" differential equations into transitional differential equations, as is shown hereinbelow. As an example of numbers, larger step widths are changed over to after five hours. Of the following four equations, the first three are therefore changed stepwise into the last one. The differential equations are written out here for the temperature difference between the inside temperature and the desired comfort temperature, as will be used later for optimising.

$$y_{5.25} - T_{comfort} = p_1(y_5 - T_{comfort}) + p_2(y_{4.75} - T_{comfort}) + p_3 u_5 + p_4 u_{4.75} + p_5 w_5 + p_6 w_{4.75} + p_7 + T_{comfort}(p_1 + p_2 - 1)$$

$$y_{5.5} - T_{comfort} = p_1(y_{5.25} - T_{comfort}) + p_2(y_5 - T_{comfort}) + p_3 u_{5.25} + p_4 u_5 + p_5 w_{5.25} + p_6 w_5 + p_7 + T_{comfort}(p_1 + p_2 - 1)$$

$$y_{5.75} - T_{comfort} = p_1(y_{5.5} - T_{comfort}) + p_2(y_{5.25} - T_{comfort}) + p_3 u_{5.5} + p_4 u_{5.25} + p_5 w_{5.5} + p_6 w_{5.25} + p_7 + T_{comfort}(p_1 + p_2 - 1)$$

$$y_6 - T_{comfort} = p_1(y_{5.75} - T_{comfort}) + p_2(y_{5.5} - T_{comfort}) + p_3 u_{5.75} + p_4 u_{5.5} + p_5 w_{5.75} + p_6 w_{5.5} + p_7 + T_{comfort}(p_1 + p_2 - 1)$$

In this way $y_6 - T_{comfort}$ can be represented with ($y_5 - T_{comfort}$), $u_5$ and $u_{4.75}$. This is achieved as described, by step-wise changing of the differential equations for ($y_{5.75} - T_{comfort}$), ($y_{5.5} - T_{comfort}$) and ($y_{5.25} - T_{comfort}$) in the equation for ($y_6 - T_{comfort}$). The result obtained is $$y_6 - T_{comfort} = [p_1^4 + 3p_1^2 p_2 + p_2^2](y_5 - T_{comfort}) + [p_1^3 p_2 + 2p_1 p_2^2](y_{4.75} - T_{comfort}) + [p_1^3 p_{3+}$$

$$2p_1 p_2 p_3 + (p_3 + p_4)(p_1^2 + p_1 + p_2 + 1)]u_5 + [p_1^3 p_4 + 2p_1 p_2 p_4]u_{4.75} + [p_1^3 p_5 + 2p_1 p_2 p_5 +$$

$$(p_5 + p_6)(p_1^2 + p_1 + p_2 + 1)]w_5 + [p_1^3 p_6 + 2p_1 p_2 p_6]w_{4.75} + [p_1^3 + p_1^2 + 2p_1 p_2 + p_1 + p_2 + 1]\{p_7 + T_{comfort}(p_1 + p_2 - 1)\}$$

The resulting set of equations for the number example described above is now as follows: 20 equations for each quarter of an hour for the time points 0.25 h to 5 h with the original parameters (for the faster pulse), a transition equation (see last equation) for the 6 h time point with transition parameters derived from the original parameters and equations for each hour for the 7 h to time horizon time points with the parameters obtained from the sampling time change process.

Identification

The seven parameters of the differential equation are estimated by a recursive least squares method. In FIG. 2 the parameter estimate is separated on the uppermost plane as a separate RLS module. Input signals of the adaptive module 13 are all measured inputs and outputs of the process, namely the flow temperature T_VRL, the external temperature T_ext and the inside temperature T_int. The estimated parameter vector θ, the forgetting factor λ and the norm of the covariant matrix P are output. The parameters are estimated from the start, their use from the start is, nevertheless, not useful. Thus, the exact time according to which the estimated parameters should find application, is output via a switch.

The adaptive module 13 is provided with the new structure $\psi_k = [y_{k-1}\ y_{k-2}\ u_{k-1}\ u_{k-2}\ w_{k-1}\ w_{k-2}\ 1]^T$ which now carries out the recursive parameter estimation with the forgetting factor (algorithm, see Ljung [3], p. 307)

$$\underline{\theta}_k = \underline{\theta}_{k-1} + \frac{P_{k-1}\underline{\varphi}_k(y_k - \underline{\varphi}_k^T \underline{\theta}_{k-1})}{\lambda + \underline{\varphi}_k^T P_{k-1}\underline{\varphi}_k}$$

$$P_{k-1} = \frac{1}{\lambda}\left[P_{k-2} - \frac{P_{k-2}\underline{\varphi}_{k-1}\underline{\varphi}_{k-1}^T P_{k-2}}{\lambda + \underline{\varphi}_{k-1}^T P_{k-2}\underline{\varphi}_{k-1}}\right]$$

$$\lambda = \lambda_{min} + (1 - \lambda_{min})\frac{|P_{k-2}|}{P_{max}}$$

A bounded gain forgetting method is used to prevent the matrix P being unbounded, as the matrix P can have unlimited amplification if the condition of persistent excitation is not satisfied. With this bounded gain forgetting method, the behaviour of the forgetting factor λ is controlled by the two adjusting parameters $\lambda_{min}$ and $P_{max}$. If the Frobenius norm $$\|A\|_{Frobenius} = \sqrt{\sum_{i,j}(a_{ij}^2)}$$

of the matrix P, which can be interpreted as the covariant matrix Σ(t+1|t) of the estimation error, increases compared to $P_{max}$, the estimation error is also larger, and λ convergent with respect to 1, so old structures are no longer "forgotten". If the excitation is greater again—the condition of persistence thus satisfied—and the parameters converge, P decreases and λ converges towards the lower limit $\lambda_{min}$.

Monitor

As with the estimation of parameters, a monitor for the inside temperature is naturally only one option, if said inside temperature is to be measured. In this case, the special feature of this monitor is its use as a filter of the known inside temperature and not for estimating an unknown value. The model of the monitor also does not exactly correspond with the room model previously derived, as the current inside temperature and the inside temperature on time step earlier are selected as structures which both find application in optimisation. This new model is produced without difficulty from the differential equation, as can be seen in the following:

Differential equation:

$$y_{k+1} = p_1 y_k + p_2 y_{k-1} + p_3 u_k + p_4 u_{k-1} + p_5 w_k + p_6 w_{k-1} p_7$$

Monitor structure:

$$\hat{x}_k = \begin{bmatrix} y_k \\ y_{k-1} \end{bmatrix}$$

Monitor system equations:

$$\hat{x}_{k+1} = \underbrace{\begin{bmatrix} p_1 & p_2 \\ 1 & 0 \end{bmatrix}}_{A}\hat{x}_k + \underbrace{\begin{bmatrix} p_3 & p_4 & p_5 & p_6 & p_7 \\ 0 & 0 & 0 & 0 & 0 \end{bmatrix}}_{B}\begin{bmatrix} u_k \\ u_{k-1} \\ w_k \\ w_{k-1} \\ 1 \end{bmatrix}$$

$$\hat{y}_k = \underbrace{[1\ 0]}_{C}\hat{x}_k$$

With reference to the sketches for the monitor hereinbelow, the monitor equation can be produced. The pole of the entire monitor system can then be pre-determined with the monitor controller matrix H.

$$\hat{x}_{k+1} = [A - HC]\hat{x}_k + Bu_k + \underline{H}y_k$$

$$= \begin{bmatrix} p_1 - h_1 & p_2 \\ 1 - h_2 & 0 \end{bmatrix}\hat{x}_k + \begin{bmatrix} p_3 & p_4 & p_5 & p_6 & p_7 \\ 0 & 0 & 0 & 0 & 0 \end{bmatrix}\begin{bmatrix} u_k \\ u_{k-1} \\ w_k \\ w_{k-1} \\ 1 \end{bmatrix} + \begin{bmatrix} h_1 \\ h_2 \end{bmatrix}y_k$$

Two types of pole input are described below: as the first, the method of pole input, which takes into account the original system, and as the second method the input of the time constants.

The pole displacement factor x determines by how much the two (real) poles of the differential equation (intrinsic value of A) in the complex planes in the continuous instance are displaced to the left or—in the corresponding discrete instance—by how much the poles of the differential equation are displaced with respect to the origin.

In order to reduce the time constants of the system with the dynamic matrix A–HC x-times with respect to the time constants of the system with the dynamic matrix A, in the discrete instance, the poles of A–HC must be selected as equal to the poles of A raised by the power of x.

Intrinsic values of A are:

$$\lambda_{1|2} = \frac{p_1 \pm \sqrt{p_1^2 + 4p_2}}{2}$$

Intrinsic values of A–HC are:

$$\Lambda_{1/2} = (\lambda_{1/2})^x$$

The determining equation of the intrinsic values of A–HC is:

$$\Lambda^2 + (h_1 - p_1)\Lambda - p_2(1 - h_2) = 0$$

The coefficient comparison with $\Lambda^2 - (\Lambda_1 + \Lambda_2)\Lambda + \Lambda_1\Lambda_2 = 0$ now allows $h_1$ and $h_2$ to be determined according to the formula below:

$$h_1 = p_1 - (\Lambda_1 + \Lambda_2)$$

$$h_2 = 1 + \frac{\Lambda_1 \Lambda_2}{p_2}$$

Direct input of the (continuous) time constants $T_{kont}$ of the monitor system is also possible. The poles of the discrete system are consequently $$\Lambda_{1|2} = \exp\left(-\frac{1}{T_{kont}}T_{sim}\right).$$

T_sim represents the sampling time of the discrete system. By coefficient comparison with the pole determining equation of the monitor system, analogous formulae for $h_1$ and $h_2$ are now produced, as described hereinabove.

Flow Temperature Control Loop with Possible Advance Control

To the flow temperature calculated by the optimiser 14 there is here made available a standard flow temperature control loop as reference value.

If the power output of the heating in the room is not linear in the temperature difference, it is assumed that the static, non-linear characteristic line of the heating is parametised with a parameter vector par.

$$P_H = f_H(T_{VRL}, T_{int}, \underline{par})$$

$$T_{int} = T_{IB\&RL}$$

can be made linear by means of an added inverse characteristic line with which the flow temperature reference value is changed such that the non-linear function can be compensated for (control in advance). This is done in that the inside temperature is replaced by its reference value T__int__soll, the power P__H by the power P__H soll calculated by the optimiser, and the above equation solved according to T_VRL and T_VRL replaced by T_VRL__soll:

$$T_{VRL\_soll} = f_H^{-1}(P_{H\_soll}, T_{int\_soll}, \underline{par})$$

If the optimiser calculates the required power, this can be used directly for P__H__soll. When the optimiser delivers the flow temperature reference value, P__H__soll must be calculated in addition. The required parameter values par can be determined from specification data.

Optimising

Over the time horizon, the control vector sequence—that is to say future flow temperatures or powers—is optimised taking into account the model equations and restrictions. The optimising is here only set out with the flow temperature, but can also be carried out with the power.

Solution with Linear Programming (LP Instance)

The following performance index should be minimised in the LP instance:

$y_i$: inside temperature at time point i $u_i$: flow temperature at time point i $$J(\underline{u}) = \sum_{i=1}^{n} f_i y_i + \sum_{i=n+1}^{2n} f_i u_{i-(n+1)}$$

As the room temperature is already adjusted by means of the restrictions, only the future flow temperatures T_VRL__pred are weighted, which correspond to the last n elements of the optimising structure. Because of the different lengths of the time intervals within the time horizon, the flow temperatures are also to be weighted correspondingly (energy costs remain the same).

Example: At the end of the time horizon, four-times larger time intervals $$\underline{f} = \begin{bmatrix} \underbrace{0000 \cdots 00}_{\text{keine Gewichtung der Innentemperaturen}} & 111 \cdots 444 \end{bmatrix}^T$$

The following equality conditions and inequality conditions designated a) to c) must also be taken into account:

a) n equations for the future inside temperatures by application of the model-based forward calculation n1 equations with small time steps:

$$y_1 = p_{11}y_0 + p_{21}y_{-1} + p_{31}u_0 + p_{41}u_{-1} + p_{51}w_0 + p_{61}w_{-1} + p_{71}$$

$$y_2 = p_{11}y_1 + p_{21}y_0 + p_{31}u_1 + p_{41}u_0 + p_{51}w_1 + p_{61}w_0 + p_{71}y_{n1}$$

$$= p_{11}y_{n1-1} + p_{21}y_{n1-2} + p_{31}u_{n1-1} + p_{41}u_{n1-2} + p_{51}w_{n1-1} + p_{61}w_{n1-2} + p_{71}$$

$$\vdots$$

$$y_{n1} = \ldots$$

1 equation for the transition step $$y_{n1+1} = p_{1\tilde{u}}y_{n1} + p_{2\tilde{u}}y_{n1-1} + p_{3\tilde{u}}u_{n1} + p_{4\tilde{u}}u_{n1-1} + p_{5\tilde{u}}w_{n1} + p_{6\tilde{u}}w_{n1-1} + p_{7\tilde{u}}$$

n−n1−1 equations with large time steps $$y_{n1+2} = p_{12}y_{n1-1} + p_{22}y_{n1} + p_{32}u_{n1+1} + p_{42}u_{n1} + p_{52}w_{n1+1} + p_{62}w_{n1} + p_{72}$$

$$y_n = p_{12}y_{n-1} + p_{22}y_{n-2} + p_{32}u_{n-1} + p_{42}u_{n-2} + p_{52}w_{n-1} + p_{62}w_{n-2} + p_{72}$$

b) 2n inequalities for flow temperature restrictions $$u_{-1} - dT\_VRL_{down} < u_0 < u_{-1} + dT\_VRL_{up}$$

$$u_0 - dT\_VRL_{down} < u_1 < u_0 + dT\_VRL_{up}$$

$$u_1 - dT\_VRL_{down} < u_2 < u_1 + dT\_VRL_{up}$$

$$u_{n-2} - dT\_VRL_{down} < u_{n-1} < u_{n-2} + dT\_VRL_{up}$$

The above inequalities produce n inequalities for flow temperature increase restriction and n inequalities for flow temperature decrease restriction—that is to say corresponding inequalities for each time point of the advance calculation. The increase restriction is $dT\_VRL_{up}$ and the decrease restriction is $dT\_VRL_{down}$.

c) 3n restrictions of the optimising structure

Restriction of the inside temperature during occupancy:

$$y_k > T_{comfort}$$

Restriction of the inside temperature during non-occupancy:

$$y_k > T_{min}$$

The above restrictions produce n inequalities.
Restriction of the flow temperature:

$$y_0 < u_0 < T\_VRL_{max}\ y_1 21\ u_1 < T\_VRL_{max} \ldots y_{n-1} < u_{n-1} < T\_VRL_{max}$$

The above restrictions produce 2n inequalities.
Solution with Quadratic Programming (OP Instance)
For the scalar instance, the following performance criterion to be minimised during occupancy is produced:

$$\tfrac{1}{2}(T_{int}-T_{comfort})q(T_{int}-T_{comfort})+\tfrac{1}{2}T_{VRL}r_2 T_{VRL}+r_1 T_{VRL}$$

The penalty factors q, r1 and r2 are part of the comfort control and are to be selected such that the desired compromise between heat energy consumption and comfort is maintained.
Solution Algorithm
Optimising can be solved with the aid of the active set method which also known by the name of projection method (see Gill [7], [8], Luenberger [9] p. 247 ff, overview see [6], or with a simplex algorithm (see press [10]).
Here, the algorithm for the linear programming instance is written in coarse characters. This can be represented as follows:
Optimising problem:

$$\underset{x \in R^n}{\text{minimise}}\ q(\underline{x}) = \underline{f}^T \underline{x}$$

$A_i \underline{x} = \underline{b}_i$ i=1, . . . , $n_{eqcstr}$
$A_i \underline{x} \leq \underline{b}_i$ i=$n_{eqcstr}$+1, . . . , $n_{vars}$
$\underline{vlb} \leq \underline{x} \leq \underline{vub}$ The algorithm useable for optimising is advantageously divided into the following main steps:
PHASE I: Finding a point which satisfies the criteria
1. Normalise $\underline{f}$, $\underline{b}$ and lines of A
2. Write bounds $\underline{vlb}$ and $\underline{vub}$ as equalities and inequalities (extension of A)
3. Deal with the equations (function eqnsolv):
   seek linear dependency under the n $eq_{cstr}$ equations, accordingly delete equations
   solve the (in our case not determined) equation system=> $\underline{x}$
   QR splitting of the active set matrix $A_A^T$=>zero space Z=Q(:, $n_{eqstr}$+1,$n_{vars}$)
4. Finding a start point for the iteration:
   If the criteria for $\underline{x}$ are not satisfied, a start procedure (see also [6], pages 2–30) is carried out, which minimises an artificial variable γ.
5. If the search was successful, the search direction $\underline{SD}=-ZZ^T\underline{f}$ is determined (steepest descent). This has the direction of the negative gradients of the function q to be minimised (in the LP instance-$\underline{f}$) projected towards the zero space.
PHASE II: Main routine, discovery of the optimum point
1. Find the distance d in the search direction SD possible until the first criterion is not satisfied. If two criteria are blocked at the same distance, the criterion which has the smaller index is taken into the active set (Bland's rule for anti-cycling; see [6]).
2. If no criterion exists in the search direction=>solution is unrestricted.
3. Dating of $\underline{x}$: $\underline{x}=\underline{x}+d\underline{SD}$ and dating of the active set $A_A$.

4. Calculate Lagrange multipliers $\underline{\lambda}$. If $\underline{\lambda} \geq 0$, the optimum solution has been found, and the algorithm terminates here, otherwise if d>0 remove the criterion which has the most negative Lagrange multiplier from the active set, if d=0, use Bland's rule for anti-cycling, and delete the criterion with the smallest index.
5. Continue from point 1.
Weather Forecast
The weather forecast is the part of the overall controller which is best dealt with separately. It has been shown that, for example, for the outside temperature forecast, if only one external temperature sensor is present, a method is sufficient which deals with the current measured value and the measured value 24 hours before the time point to be estimated.
Preparation of the Control Method
Preparation of the adjustment parameters and initial criteria for the room model and the controller, user and weather data.
Implementation of the Control Method
1. The controller reads-in the current weather data, the inside temperature, the flow temperature and the discrete time.
2. The weather forecast is implemented. A forecast profile of the length of the time horizon results.
3. A monitor can be used for inside temperature filtering.
4. The room occupancy is calculated in advance over the time horizon.
5. The parameters of the room model of the controller are estimated with an RLS-BGF method.
6. If the model parameters are estimated, the associated parameters for the slower pulse must be determined.
7. The optimum flow temperature profile is calculated b an LP or QP algorithm, from which a first value is established.
8. Dating of the data stored in the interim.
9. Switching of the pump, recording of the desired data.
Information with Respect to the Means Necessary for Implementation
It is obvious that the predictive controller 1 is advantageously provided with at least one processor or microcomputer and memory modules for storing programmes and data. Because the predictive controller 1 is provided with at least a first data store, in which rules based on a linear consumer model for calculating process values are stored, a second data store in which rules for restrictions to be observed or limit values for process values and values derived from process values are stored, and means for repeatable optimising of the energy consumption or the energy costs with the aid of linear programming, and is configured such that the optimising can be done over a sliding time horizon, the advantages of the invention described can be obtained.

In a variation of the invention, instead of the means for repeatable optimising of the energy consumption or of the energy costs with the aid of linear programming, the controller 1 is provided with means for repeatable optimising of process values and of values derived from process values, and of the energy consumption or the energy costs with the aid of quadratic programming.

List of literature to which reference is made in the description
[3] System identification
   Theory for the user Lennart Ljung Prentice-Hall 1987
      ISBN 0-13-881640-9

[5] Abtastregelung [sampling control]
J. Ackermann Springer Verlag 1972 ISBN 3-540-05707-2
[6] Optimization Toolbox User's Guide Mary Ann Branch, Andrew Grace The Maths Works 1996
[7] Procedures for Optimization Problems with a Mixture of Bounds and General Linear Constraints
P. E. Gill, W. Murray, M. A. Saunders and M. H. Wright ACM Trans. Math. Software, Vol. 0, pp. 282–298, 1984
[8] Numerical Linear Algebra and Optimization, Vol. 1
P. E. Gill, W. Murray, M. H. Wright Addison Wesley 1991
[9] Introduction to linear and nonlinear programming
David. G. Luenberger Addison Wesley 1973 ISBN 0-201-04347-5
[10] Numerical Recipes in C
The Art of Scientific Computing, Second Edition W. H. Press, S. A. Teukolsky, W. T. Vetterling, B. P. Flannery Cambridge University Press 1992 ISBN 0-521-43108-5

We claim:

1. Predictive apparatus for controlling or regulating supply values, wherein the apparatus is provided with:
    a first data store, in which rules, based on a linear consumer model, for calculating supply values are stored,
    a second data store, in which the rules for restrictions or limit values to be observed for supply values and values derived from process values are stored, and
    means for repeatable optimizing of energy consumption or of energy costs of the supply values with the aid of linear or quadratic programming,
    wherein the means is configured such that the optimizing can be carried out over a sliding time horizon taking into account the rules stored in the first and the second data store.

2. Apparatus according to claim 1, wherein the consumer model is a room model and the rules for calculating indoor climate control values as room or wall temperature occurring in the room model are embodied by means of a system of equations, and wherein at least one equation is assigned to a discrete time point of the time horizon.

3. Apparatus according to claim 2, wherein restrictions for the indoor climate control values describing comfort are embodied by a system of inequalities, and wherein at least one inequality is assigned to a discrete time point of the time horizon.

4. Apparatus according to claim 3, wherein limit values for the restrictions are dependent upon an expected room occupancy.

5. Apparatus according to claim 1, wherein restrictions for energy carrier temperature process values or of power available are embodied by a system of inequalities, and wherein several inequalities are assigned to a discrete time point of the time horizon.

6. Apparatus according to claim 1, wherein restrictions for changing flow temperature process value are embodied by a system of inequalities, and wherein several inequalities are assigned to a discrete time point of the time horizon.

7. Apparatus according to claim 1, wherein the time horizon for optimizing is divided into at least two time ranges, and wherein sequential discrete time points in a first time range are closer to one another than in a second time range.

8. Apparatus according to claim 7, wherein a gap between the sequential discrete time points of the second time range is a multiple of a gap between the sequential discrete time points of the first time range.

9. Apparatus according to claim 1, wherein the apparatus is configured such that parameters of the consumer model can be independently adaptively changed.

10. Apparatus according to claim 9, wherein the apparatus is configured such that parameters of the consumer model can be estimated by a recursive least-squares method with so-called bounded gain forgetting.

11. Apparatus according to claim 1, wherein the apparatus is configured such that indoor climate control values or process values are measured and the measured values can be used for optimizing.

12. Apparatus according to claim 11, further comprising a filter by means of which a measured indoor climate control value or measured process value can be transformed before being returned to a data input of the apparatus.

13. Apparatus according to claim 12, wherein the filter is a structure estimator.

14. Apparatus according to claim 13, wherein the filter is a Kalman filter.

15. Apparatus according to claim 1, wherein the apparatus is configured such that estimated development over time of disturbance values affecting the process, such as, for example, outside temperature or incoming solar radiation, are calculated in advance over the time horizon of the optimizing, and are taken into account in the optimizing.

16. Apparatus according to claim 15, wherein the apparatus is configured such that the development over time of a disturbance value affecting the process can be estimated by means of a weather model.

17. Apparatus according to claim 16, wherein the apparatus is configured such that parameters of the weather model can be automatically adaptively changed.

18. Apparatus according to claim 1, wherein the apparatus is configured such that static non-linearities of a power output system can be reduced by means of a non-linear function unit.

19. Apparatus according to claim 1, further comprising
    a building with at least one room orientated substantially south and one substantially north, with a heating circuit, with a reference room orientated towards the north with a room temperature sensor,
    wherein the connection between heating power required in the reference room and flow temperature required is given by an equation which calculates the heating power at constant mass flow through the heating circuit of the reference room proportional to a temperature differential between the flow temperature and the reference room temperature.

20. Apparatus according to claim 19, wherein a room not used as the reference room is provided with a thermostatic valve.

* * * * *